(12) United States Patent
Mohtasham

(10) Patent No.: US 6,468,178 B1
(45) Date of Patent: Oct. 22, 2002

(54) REAR WHEEL HUB WITH DRIVE TRAIN GEAR ASSEMBLY, SPINDLE AND CRANKS FOR USE ON A BICYCLE

(76) Inventor: Mani Mohtasham, 10204 Garrett St., Vienna, VA (US) 22181

( * ) Notice: Subject to any disclaimer, the term of this patent is extended or adjusted under 35 U.S.C. 154(b) by 0 days.

(21) Appl. No.: 09/847,830

(22) Filed: May 2, 2001

(51) Int. Cl.[7] .............................................. B62M 11/16
(52) U.S. Cl. ...................... 475/277; 475/288; 280/238
(58) Field of Search ................................ 475/275, 277, 475/288, 289, 296, 297; 280/236, 238

(56) References Cited

U.S. PATENT DOCUMENTS

| | | | | |
|---|---|---|---|---|
| 4,721,015 A | * | 1/1988 | Hartmann | 280/260 |
| 4,955,627 A | * | 9/1990 | Hartmann | 280/236 |
| 4,986,556 A | * | 1/1991 | Hartmann | 280/260 |
| 5,443,279 A | * | 8/1995 | Nurnberger | 192/217.4 |

FOREIGN PATENT DOCUMENTS

DE         2841992 A1 *  4/1980

* cited by examiner

Primary Examiner—Rodney H. Bonck
Assistant Examiner—Ankur Parekh
(74) Attorney, Agent, or Firm—Robert M. Downey, P.A.

(57) ABSTRACT

A rear wheel hub and chainless drive train gear assembly for use on a bicycle having an axle bracket fixed to the frame of the bicycle, a spindle extending axially through the axle bracket and left and right pedal crank arms for rotating the spindle upon application of a pedaling force. A primary drive gear fitted to the spindle drivingly engages carrier gears which operate a planet gear cage housing and a multiple planetary gear and sun gear arrangement according to various gear ratios determined by selective operation of a clutch assembly. Planetary gear groups each include an integral set of planetary gears of varying size which mesh with corresponding sun gear rings. Operation of the clutch assembly serves to selectively engage pawl stops with a corresponding sun gear ring, thereby engaging the corresponding sun gear ring with one of the planetary gears of the planetary gear groups according to a selected gear ratio. The planetary gear groups drive an annular gear ring and an associated annular needle bearing which, in a forward clockwise rotation, engages the hub body to rotate the rear bicycle wheel. Reverse rotation of the annular gear, in a counter-clockwise rotation, results in a freewheeling of the drive train gear assembly relative to the hub body.

5 Claims, 19 Drawing Sheets

REAR WHEEL HUB WITH DRIVE TRAIN GEAR ASSEMBLY, SPINDLE AND CRANKS FOR USE ON A BICYCLE

BACKGROUND OF THE INVENTION

1. Field of the Invention

The present invention relates generally to a rear wheel hub and drive train assembly for a bicycle and, more particularly, to a rear wheel hub and chainless drive train gear assembly which is operable in conjunction with a spindle, crank arms and pedals to drivingly rotate the rear wheel of a bicycle at either a single speed or at multiple selected speeds.

2. Discussion of the Related Art

The drive train design of most bicycles incorporates a chain connected between a sprocket and a gear assembly near the rear wheel hub. Typically, the sprocket is fitted to an axle extending through a bearing on the bicycle frame between the front and rear wheels. The sprocket, driven directly by pedals attached to crank arms, rotates to move the chain about a loop between the sprocket and the gear assembly. On multi-speed bicycles, having several different gear speeds, a derailer is provided for moving the chain among various sized gears at the gear assembly near the rear wheel hub. Derailers, which are typically operated by a cable and control on the handlebars, have been known to be problematic. On many occasions, the derailer will not successfully move the chain from one gear size to the next, causing the chain to become "derailed" in disengagement with the gear assembly. When this happens, the bicycle rider is required to manually place the chain back into engagement with teeth on one of the gears near the rear wheel, and then, upon rotating the pedals, the chain is fully becomes re-engaged with the gears. This process can sometimes by frustrating and messy, causing the bicycle rider's hands to be covered with grease from the chain. Also, because the chain and gear assembly are openly exposed to the environment, sand, dirt and other debris eventually attach to the grease on the chain and gears, causing excessive grinding and wear of both the chain and gears. This can also interfere with effective engagement of the chain between the various gear sizes when switching between gear speeds. A further problem resulting from the exposed nature of the chain driven drive train assemblies of bicycles is entanglement of clothing, shoelaces, and other articles with the chain and the sprocket gear and/or rear gear assembly.

Chain driven drive gear assemblies present a further problem of adding extra weight to the bicycle. Specifically, the requirement of a sprocket gear, sprocket bearing, and chain add extra weight to the bicycle. Moreover, the positioning of the sprocket and pedals requires significant spacing between the front and rear wheels, thereby requiring a longer frame to separate the front and rear wheels. This also adds to the weight of the bicycle, which is undesirable, particularly, in competitive bicycling sports, such as racing and acrobatics.

In an attempt to improve the gear systems on bicycles, others have proposed various mechanisms and apparatus for increasing the efficiency and longevity of the drive train assembly. In particular, the U.S. patent to Nagano, U. S. Pat. No. 5,273,500, discloses a self-contained change speed apparatus for use on a bicycle. The apparatus in Nagano includes a drive member and a hub body rotatably supported on a fixed shaft, and two planetary gear mechanisms arranged on a drive transmission path extending from the drive member to the hub body. The drive member has a chain wheel or gear which is driven by a drive chain. The drive chain extends to a forwardly positioned sprocket and pedal assembly, of a conventional arrangement. Accordingly, while the Nagano apparatus provides an improvement to the gear arrangement and assembly on the bicycle for changing speeds, the problems associated with a chain driven drive train assembly remain unsolved.

Accordingly, in view of the problems and shortcomings of the various drive train gear assemblies in the bicycle art, there still remains an urgent need for an improved, chainless drive train assembly which is incorporated within the rear wheel hub of a bicycle and in direct, axial driven engagement with the pedals and crank arms of the bicycle.

OBJECTS AND ADVANTAGES OF THE PRESENT INVENTION

With the foregoing in mind, it is a primary object of the present invention to provide an improved drive train assembly for use on bicycles which eliminates the use of a chain.

It is also a primary object of the present invention to provide an improved driven train assembly for bicycles which is incorporated within the rear wheel hub and which further includes an axial spindle which is concentric with the rear wheel hub and drive train gear assembly and which is driven directly by crank arms and pedals without the use of a chain.

It is still a further object of the present invention to provide a rear wheel hub and chainless drive train gear assembly which enables closer spacing of the front and rear wheels of a bicycle, thereby reducing weight of the bicycle.

It is still a further object of the present invention to provide a rear wheel hub and chainless drive train gear assembly for a bicycle which is specifically structured and disposed to permit optimal positioning of the bicycle rider relative to the rear wheel of the bicycle.

It is still a further object of the present invention to provide a rear wheel hub and chainless drive train gear assembly which is structured and disposed to permit a bicycle rider to pedal the bicycle while seated at an advantageous posture.

It is still a further object of the present invention to provide a rear wheel hub and drive train gear assembly which is adapted for use in conjunction with a bicycle having an adjustable chest rest and an adjustable handle bar, to enable positioning of the bicycle rider at an optimal posture, thereby reducing wind resistance, muscle fatigue and the likelihood of injury, while increasing the bicycle rider's output and performance.

These and other objects and advantages of the present invention are more readily apparent with reference to the detailed description and accompanying drawings.

SUMMARY OF THE INVENTION

The present invention is directed to a rear wheel hub and drive train gear assembly for use on a bicycle having a hub axle bracket shell fixed to the frame of the bicycle, a spindle extending axially through the hub axle bracket shell and rotatable therein upon application of a pedaling force transmitted through left and right crank arms attached to opposite ends of the spindle. A primary drive gear fitted to the spindle drivingly engages carrier gears which operate a planet gear cage housing and multiple planetary gear and sun gear arrangement according to various gear ratios determined by selectively operation of a clutch assembly. Direct attachment of the pedal operated crank arms to the spindle provides a chainless drive train assembly for rotating the rear bicycle wheel. Planetary gear groups each include an integral set of planetary gears of varying size which mesh with corresponding sun gear rings. Operation of the clutch assembly serves to selectively engagement pawl stops with a corresponding sun gear ring, thereby engaging the corresponding sun gear ring with the planetary gear of the planetary gear groups. The planetary gear groups drive an annular gear ring and an associated annular needle bearing which, in a forward clockwise rotation, engages the hub body to rotate the rear bicycle wheel. Reverse rotation of the annular gear, in a counter-clockwise rotation, results in a freewheeling of the drive train gear assembly relative to the hub body.

BRIEF DESCRIPTION OF THE DRAWINGS

For a fuller understanding of the nature of the present invention, reference should be made to the following detailed description taken in conjunction with the accompanying drawings in which.

Like reference numerals refer to like parts throughout the several views of the drawings.

DETAILED DESCRIPTION OF THE PREFERRED EMBODIMENTS

Figure 1:
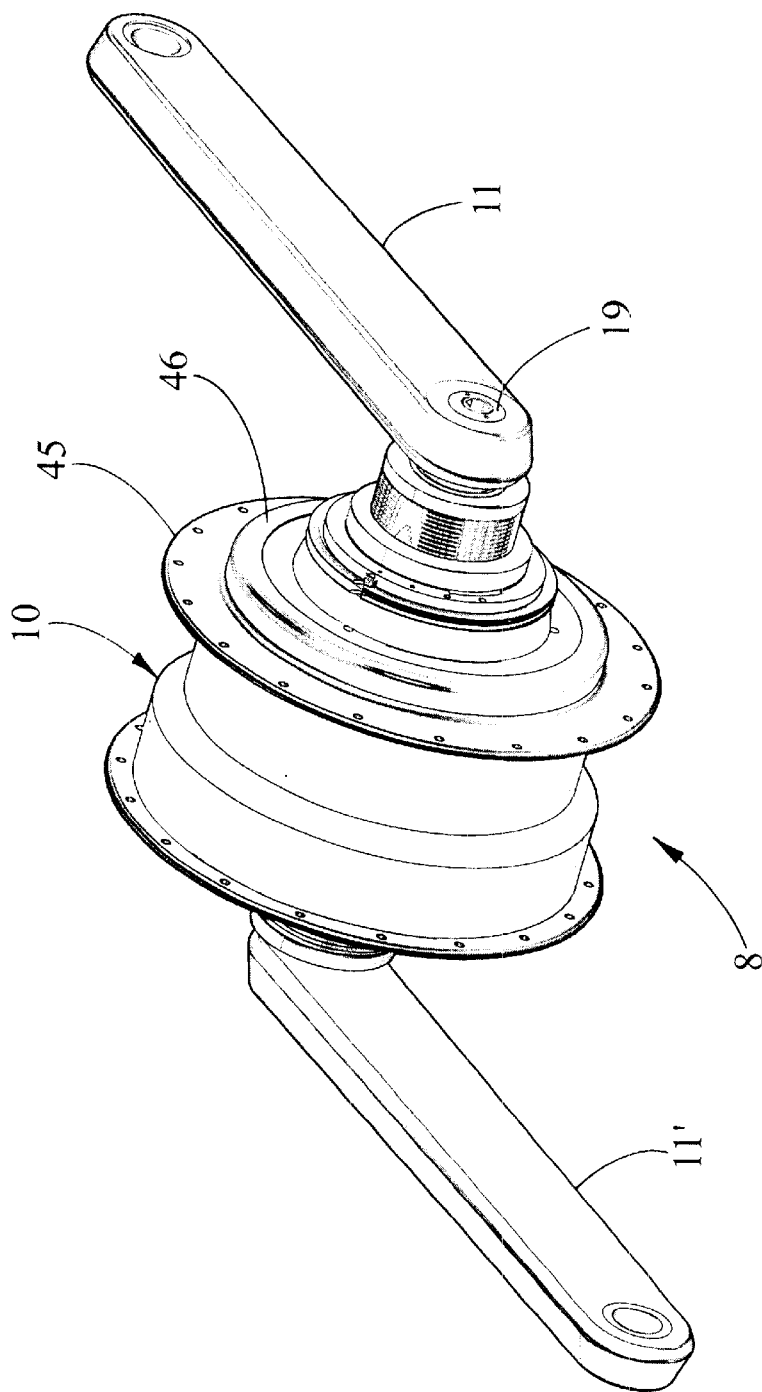
FIG. 1 is an external perspective view of the assembled rear wheel hub and drive train gear assembly with crank arms attached.
Figure 2:
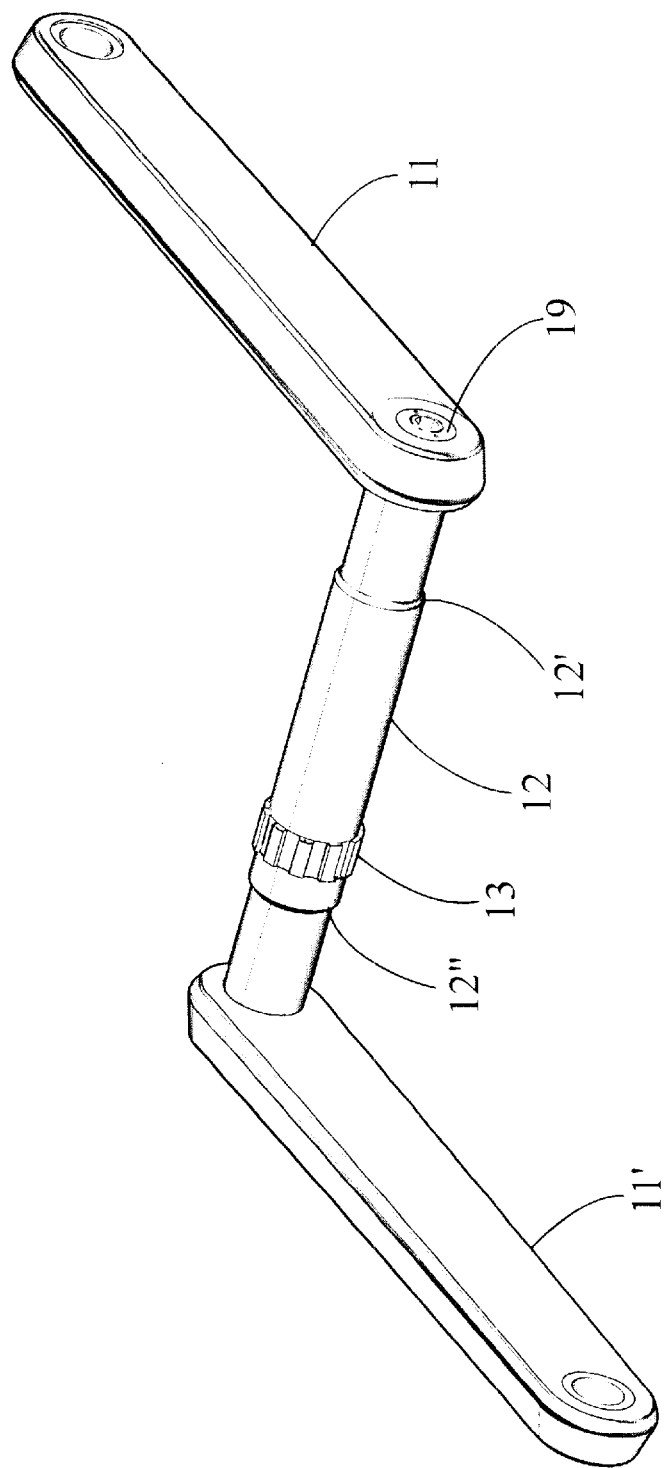
FIG. 2 is a perspective view showing the spindle and attached crank arms of the invention.
Figure 3:
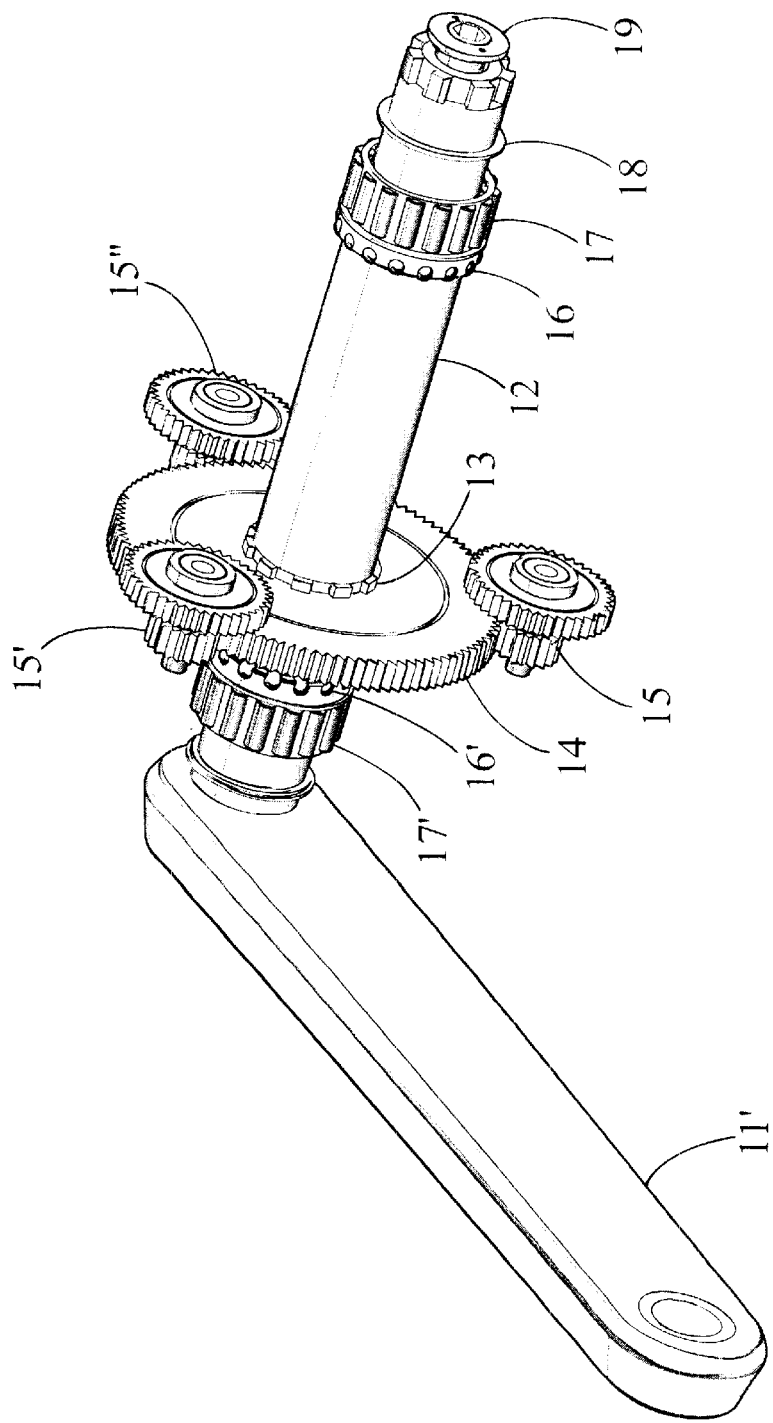
FIG. 3 is a perspective view showing the spindle with a primary drive gear, carrier gears, and bearings fitted thereto.
Figure 4:
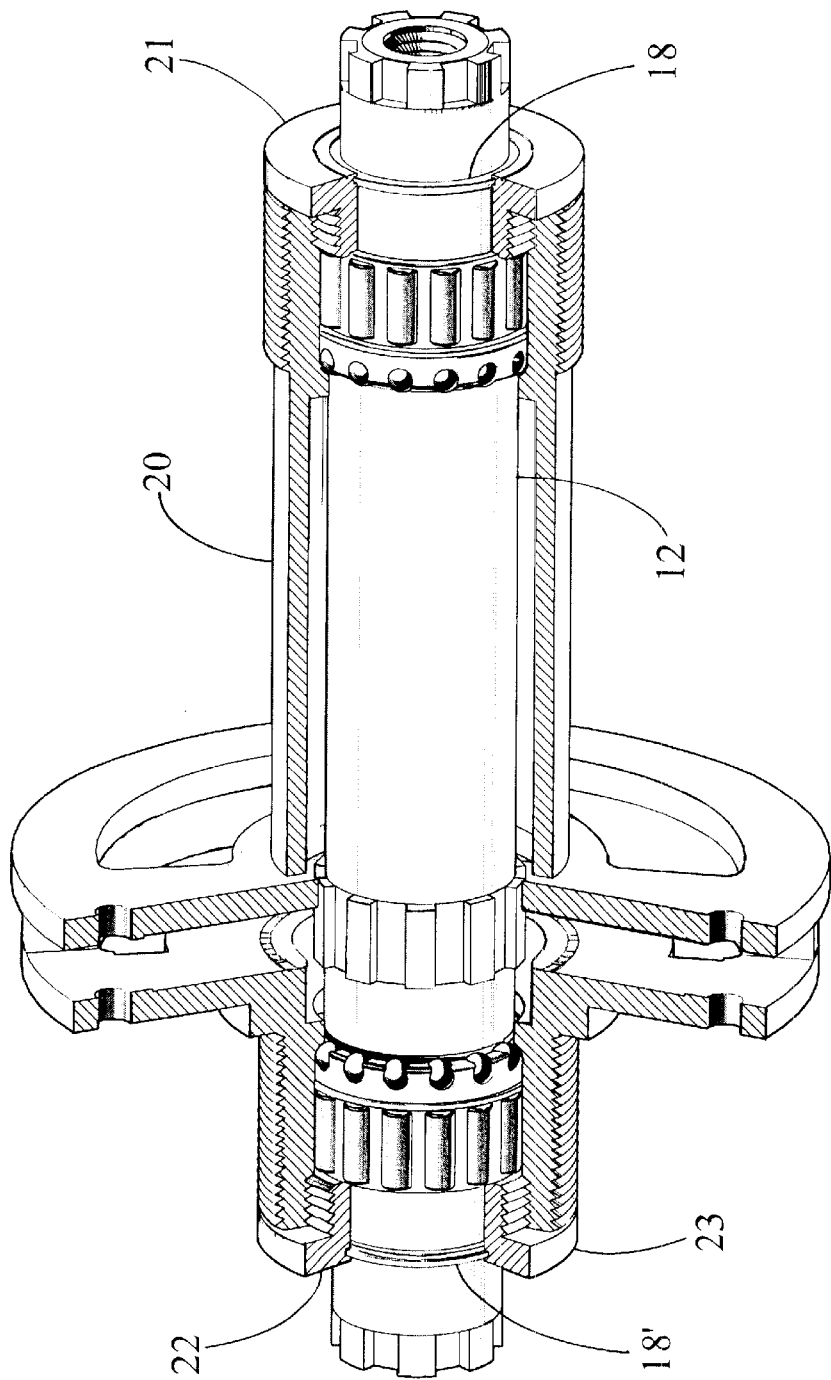
FIG. 4 is a perspective view, in partial cutaway, showing the spindle extending axially through a hub axle bottom bracket shell of the assembly.
Figure 5:
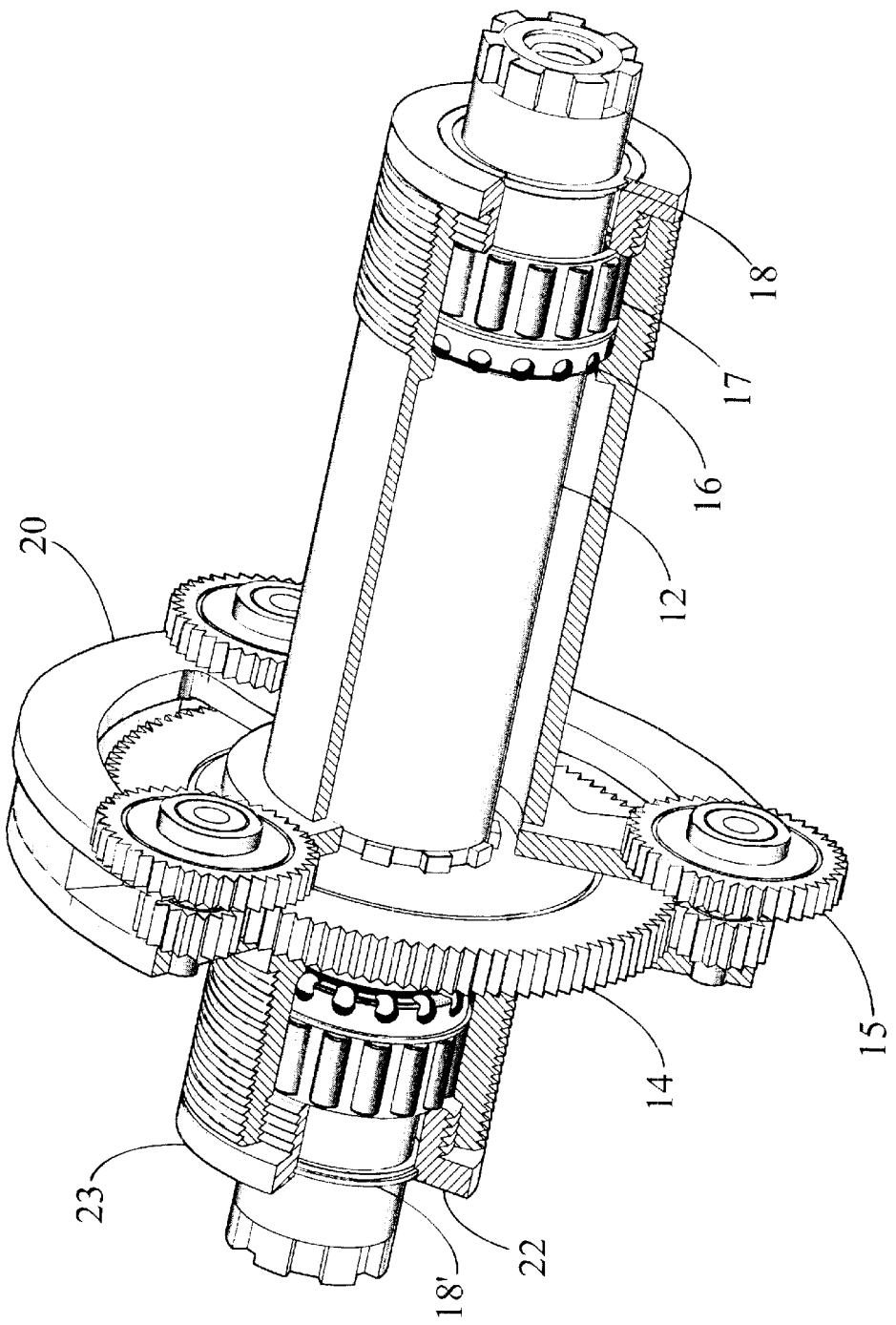
FIG. 5 is a perspective view, in partial cutaway, showing the spindle, primary drive gear, carrier gears, and hub axle bottom bracket shell assembled.
Figure 16:
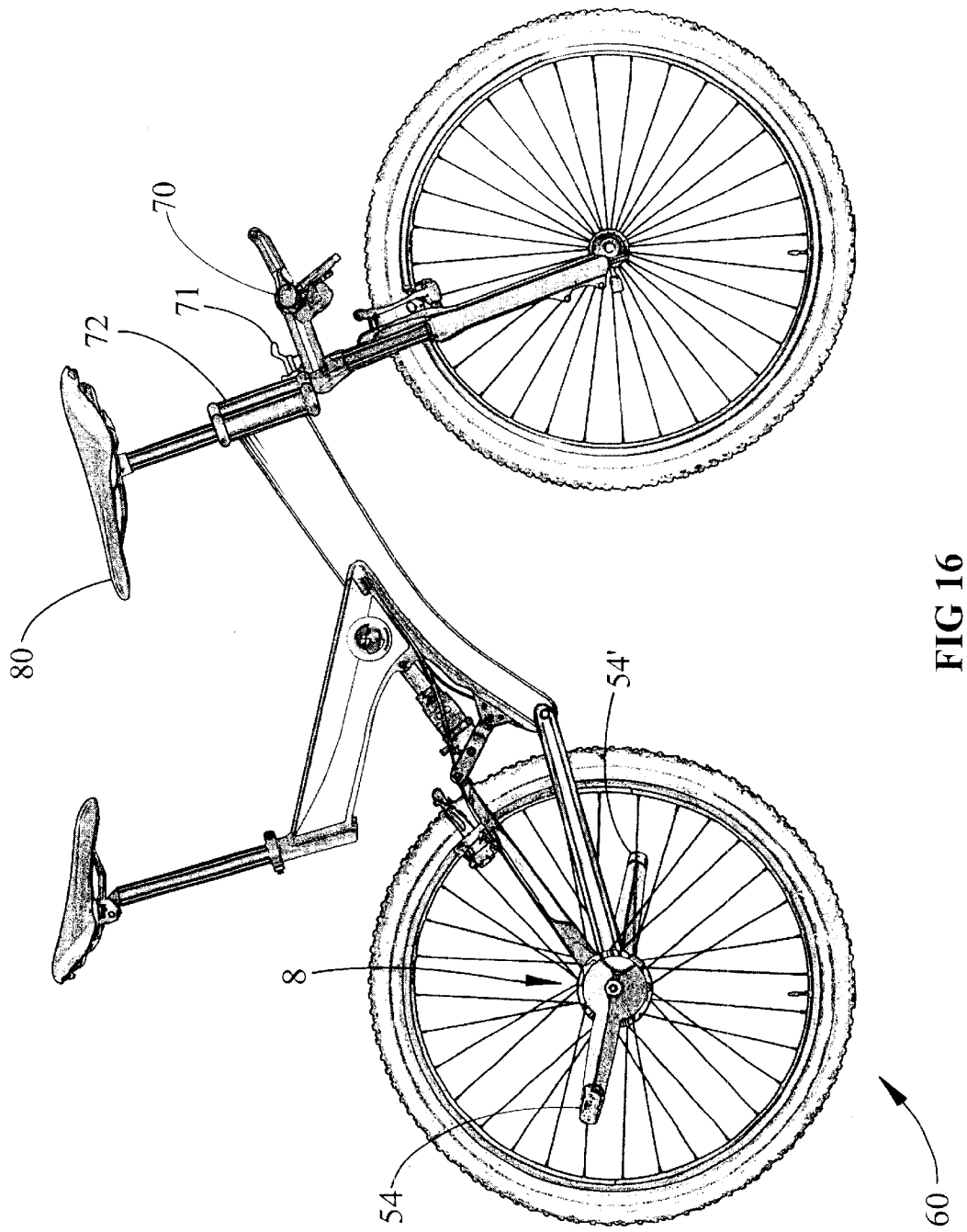
FIG. 16 is a side elevational view of a bicycle with the rear wheel hub and drive train gear assembly of the present invention.
Figure 17:
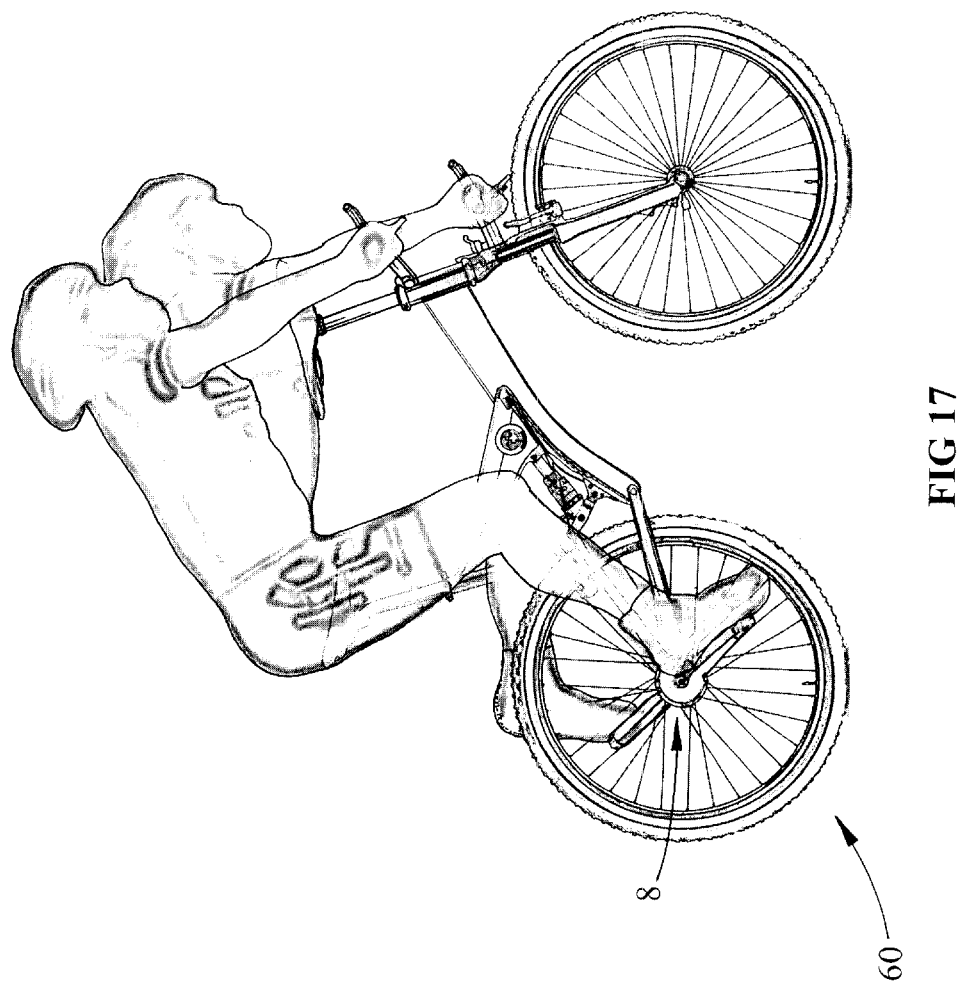
FIG. 17 is a side elevational view illustrating various positions of a rider of the bicycle using the hub and drive gear assembly of the present invention in conjunction with an adjustable chest rest and an adjustable handle bar on the bicycle.
Figure 18:
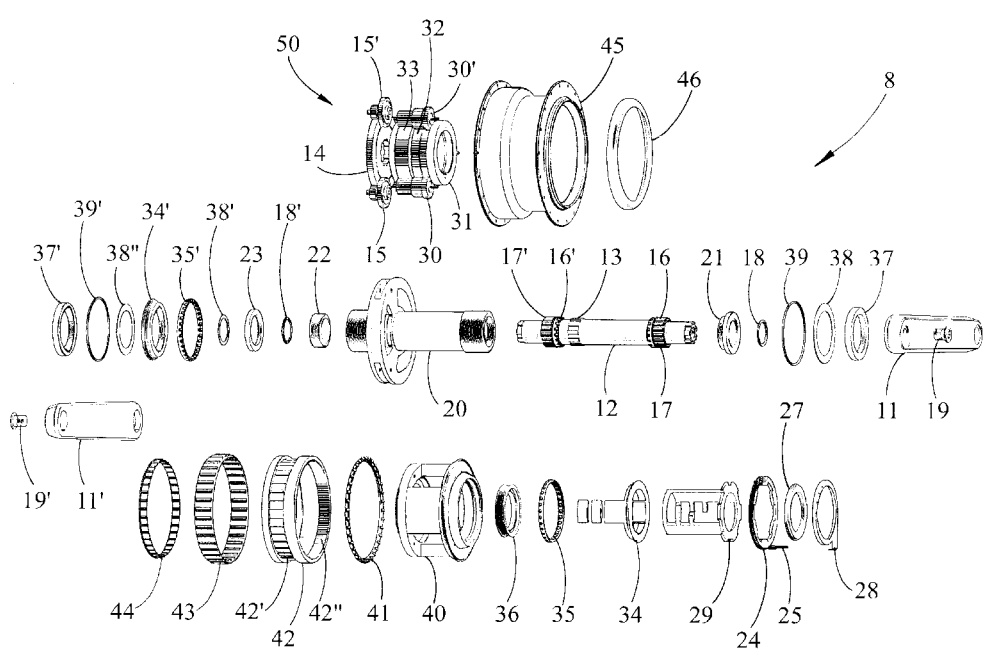
FIG. 18 is an exploded right perspective view showing the separated components of the drive train gear assembly of the present invention.
Figure 19:
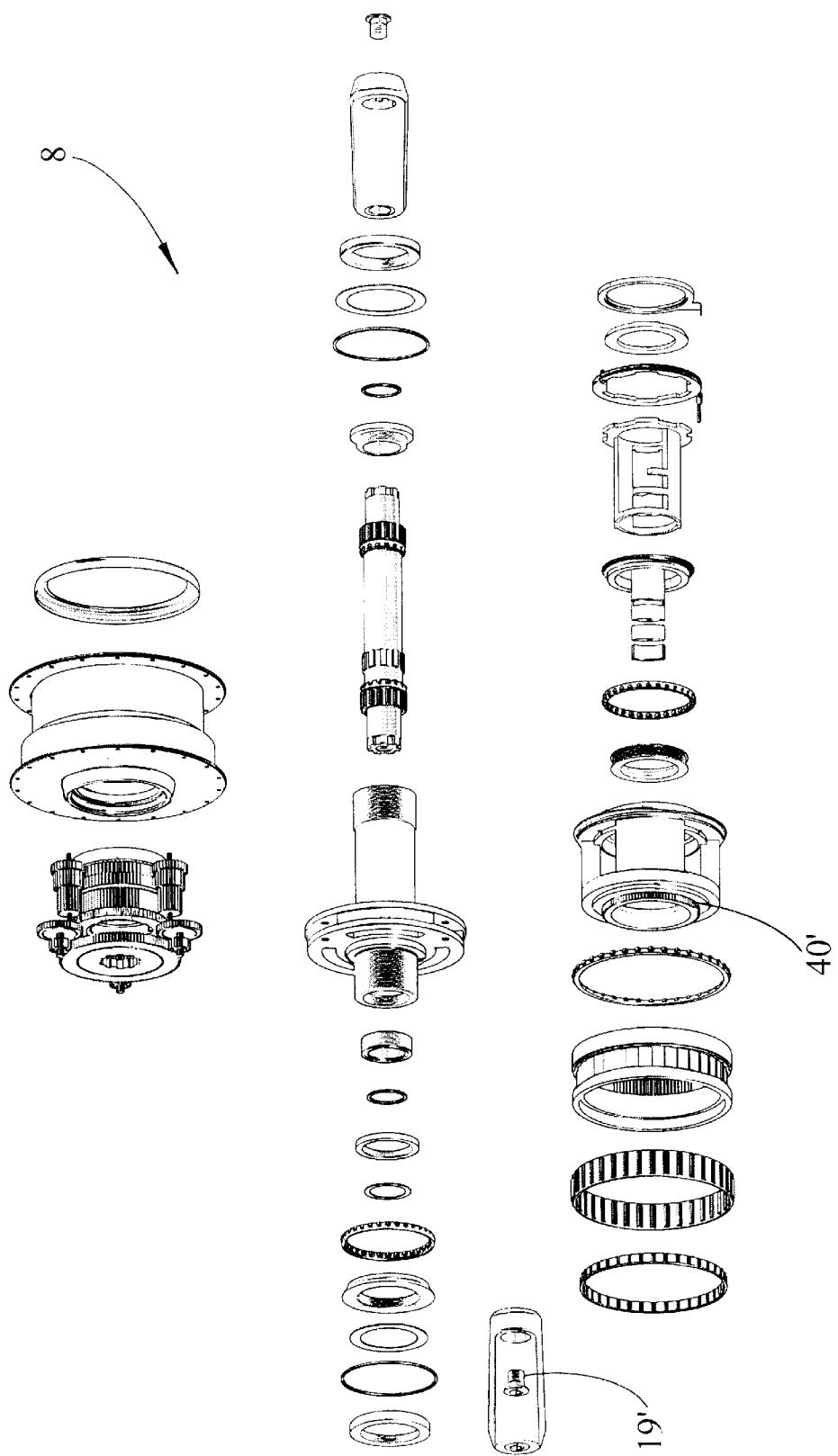
FIG. 19 is an exploded left perspective view showing the separated components of the drive train gear assembly of the present invention.

Referring to the several views of the drawings, and initially FIGS. 1–5, the hub and drive train gear assembly of the present invention is shown and is generally indicated as 8. The assembly 8 includes a hub body 10 which provides a shell about the spindle 12 and drive train gear assembly, while also providing a means for attachment of radiating spokes for supporting a rim of a bicycle wheel, as seen in FIGS. 16 and 17. The hub body 10 is fixed to the bicycle frame through a hub axle bottom bracket shell 20, as seen in FIG. 4. The hub axle bottom bracket shell 20 is a non-rotating component which provides a means for attaching the assembly 8 to the frame of the bicycle, while also providing a body for assembly of the components of the drive train gear assembly. Specifically, the components of the drive train gear assembly are assembled both through the hollow interior of the hub axle bottom bracket shell 20 as well as around its exterior. As seen in FIG. 4, spindle 12 extends axially through the hub axle bottom bracket shell 20 and includes opposite distal end portions which extend outwardly beyond the hub axle bottom bracket shell 20. Crank arms 11 are fixed to the opposite distal ends of the spindle 12 using bolts 19, 19'. Naturally, pedals are fitted to the opposite free ends of the crank arms to facilitate rotating motion of the crank arms by application of a pedaling force by the bicycle rider. As the crank arms are rotated in a forward driving pedaling motion by the bicycle rider, the crank arms 11 and 11' in turn rotate the spindle 12 along with a multi-spline joint 13 and the main drive gear 14 (see FIGS. 2 and 3). Three carrier gears 15, 15', and 15" are intermeshed with the primary drive gear at spaced intervals so that upon driven rotation of the drive gear 14, the three carrier gears 15, 15' and 15" are caused to counter-rotate (i.e., rotating in an opposite direction relative to the direction of rotation of the main drive gear).

Figure 6:
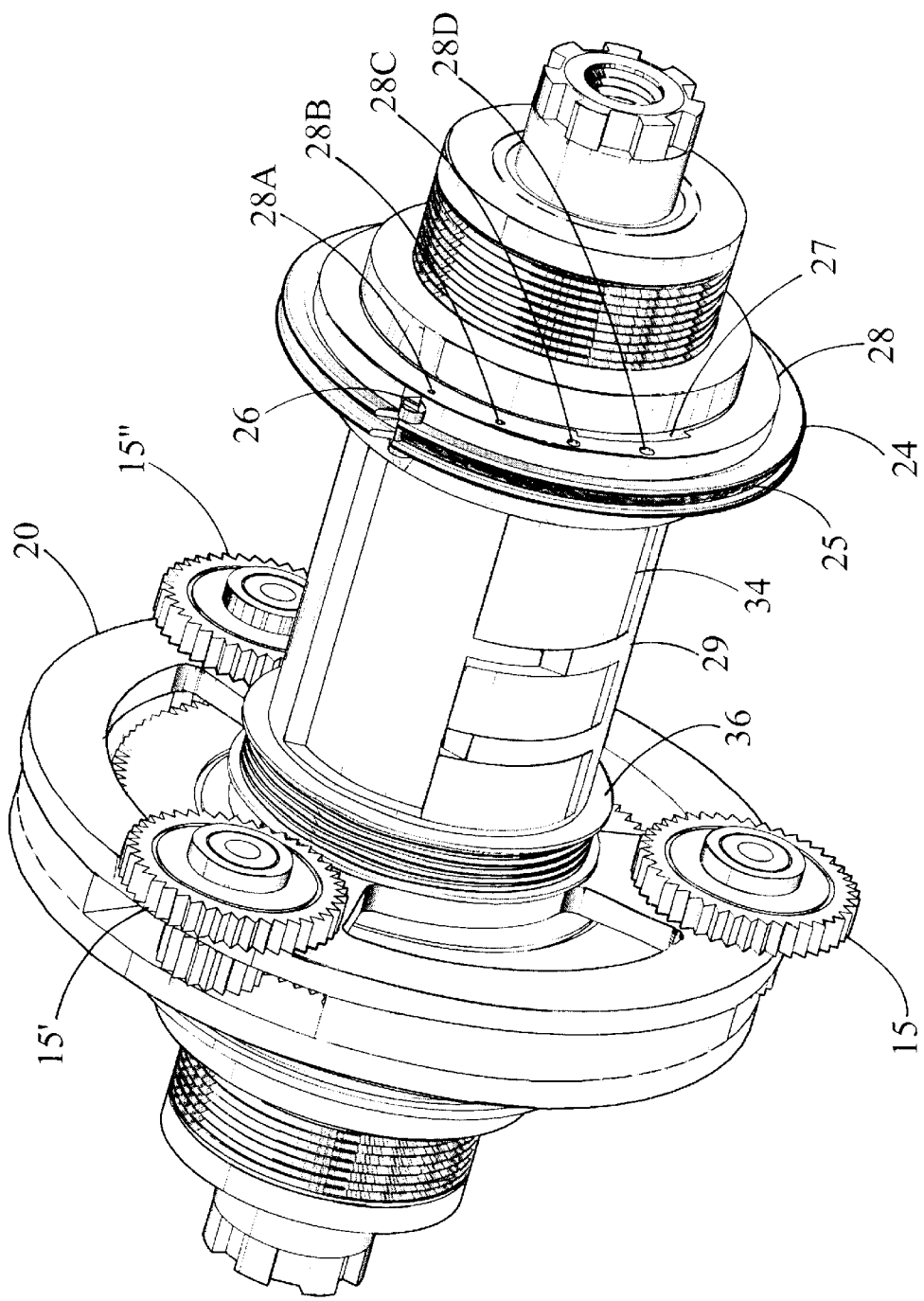
FIG. 6 is a perspective view showing a clutch assembly fitted to the combined assembly of FIG. 5.
Figure 7:
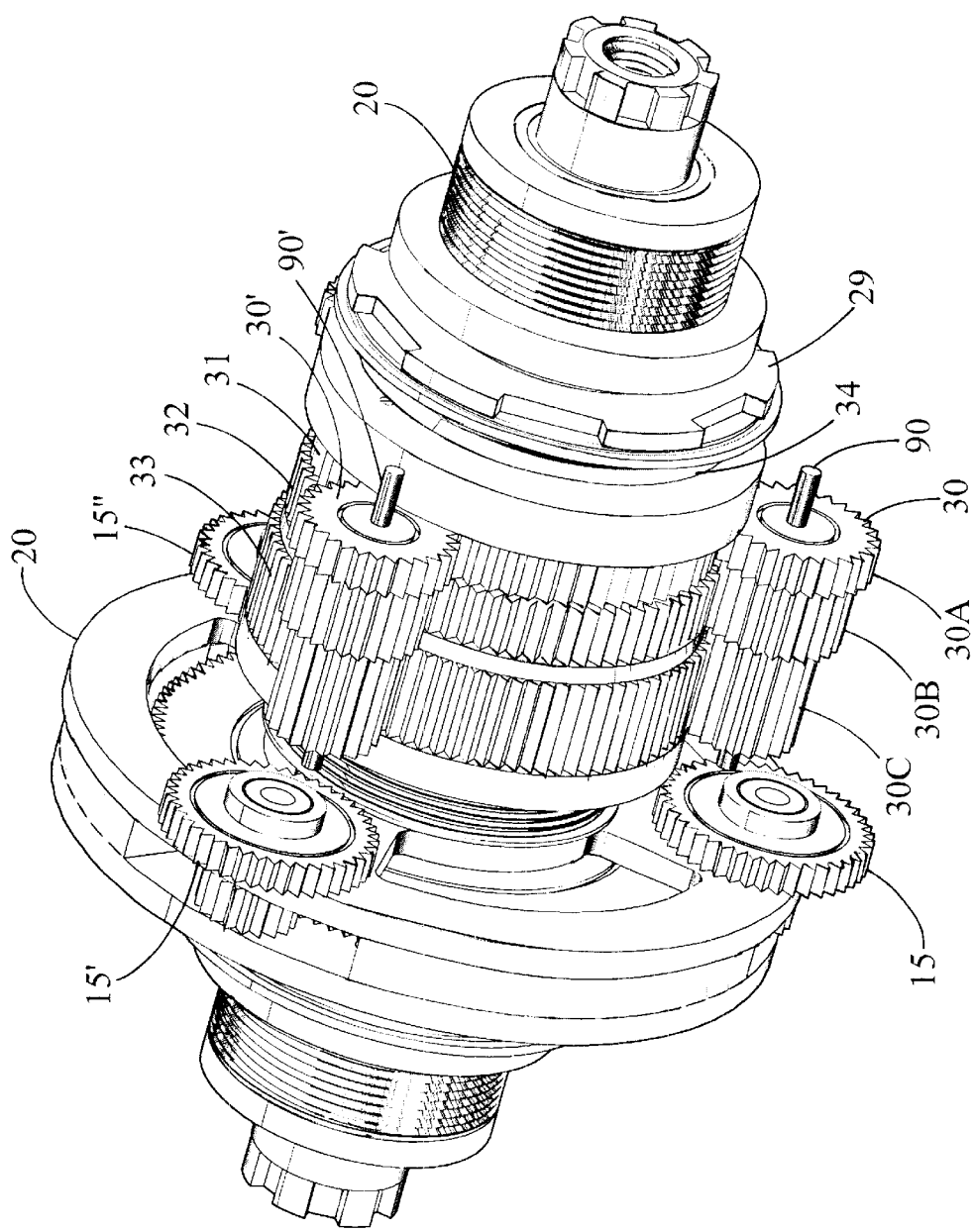
FIG. 7 is a perspective view showing a sun ring pawl and planetary gear assembly fitted about the clutch assembly on the hub axle bottom bracket shell.

Referring to FIGS. 6–9, the drive train gear assembly further includes a clutch assembly, including a clutch sleeve 29 and a cooperating cone pawl stop 34 which is fixed on the hub axle bottom bracket shell 20. The clutch sleeve 29 and cone pawl stop 34 are fitted about the central section of the hub axle bottom bracket shell 20, as best seen in FIG. 6. The drive train gear assembly further includes sun gear ring pawls 31, 32 and 33 received about the clutch sleeve 29 and cone pawl stop 34, as seen in FIG. 7. Planetary gear groups 30, 30', and 30" drivingly intermesh with respective ones of the sun gear ring pawls 31, 32 and 33. Each planetary gear group includes three planetary gears, including a large planetary gear 30A, a medium planetary gear 30B, and a small planetary gear 30C.

Figure 8:
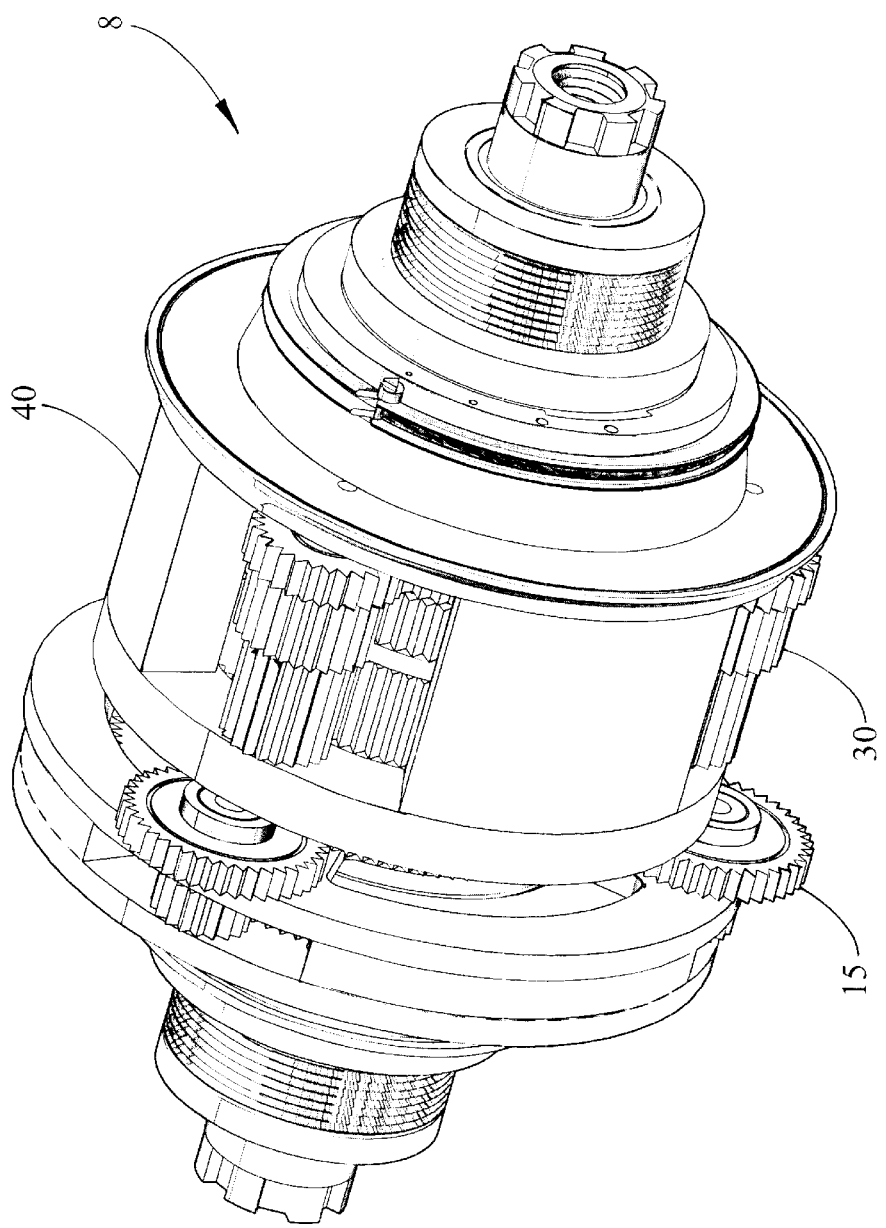
FIG. 8 is a perspective view showing a planetary gear cage fitted about the planetary gear assembly.

As seen in FIG. 8, a planetary gear cage 40 supports each of the planetary gear groups 30, 30' and 30" in intermeshing, driving engagement with the respective sun gear ring pawls 31, 32 and 33. Specifically, the planetary gear cage 40 supports the opposite ends of an axle pin 90 which extends axially through each planetary gear group.

Figure 9:
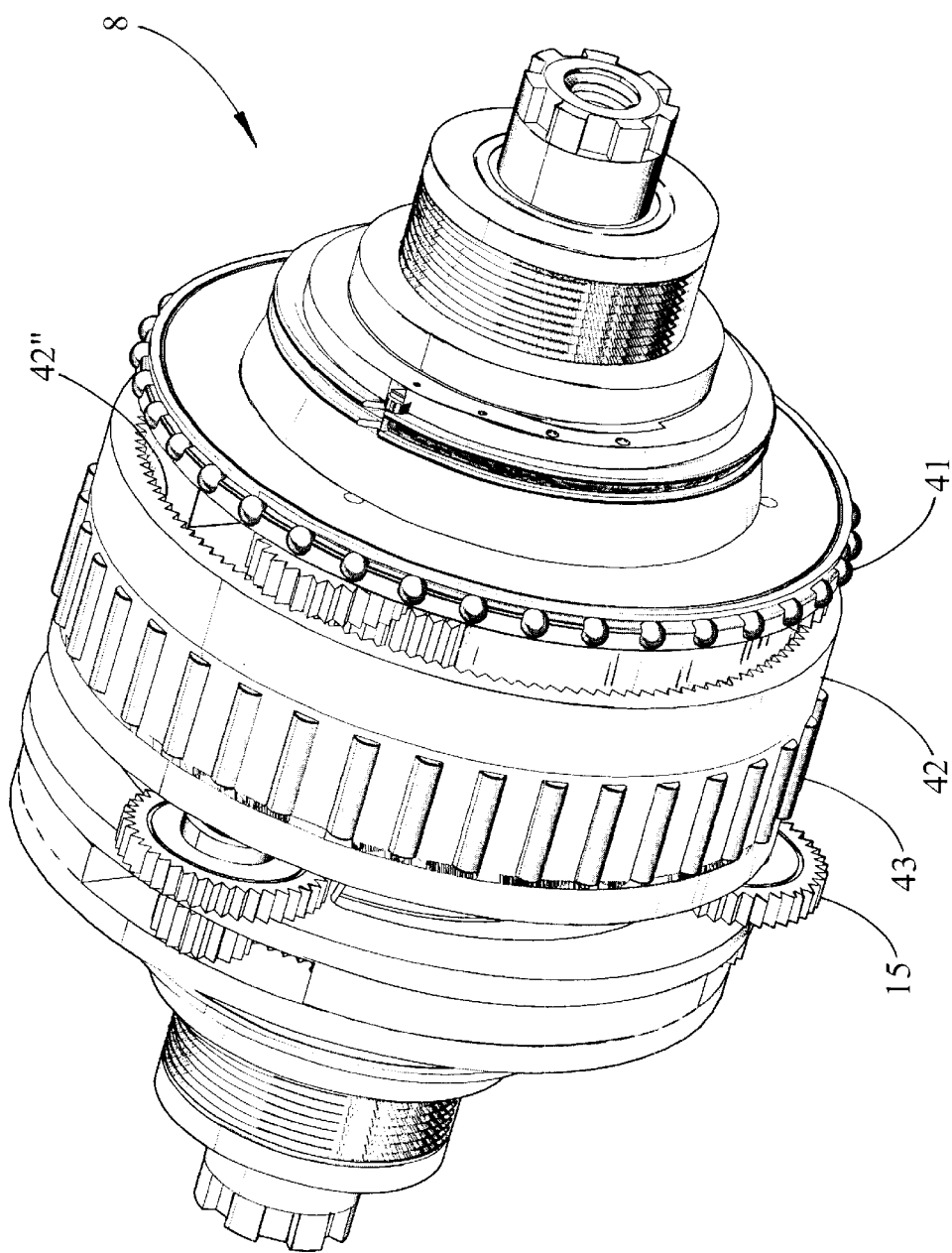
FIG. 9 is a perspective view illustrating a further assembled stage of the invention wherein an annular gear ring is fitted about the planetary gear cage.
Figure 10:
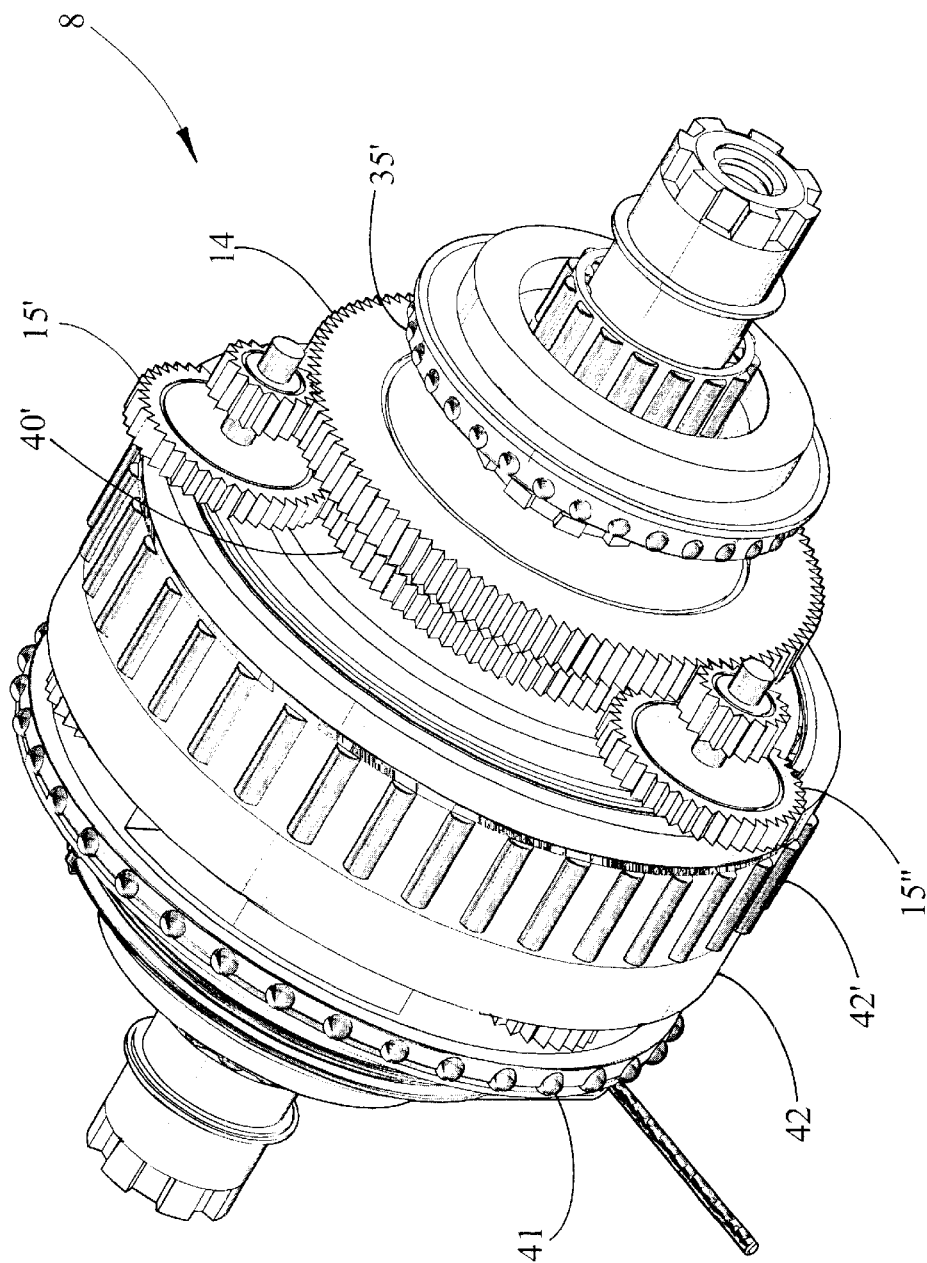
FIG. 10 is a perspective view showing the assembly of FIG. 9 from an opposite end.
Figure 11:
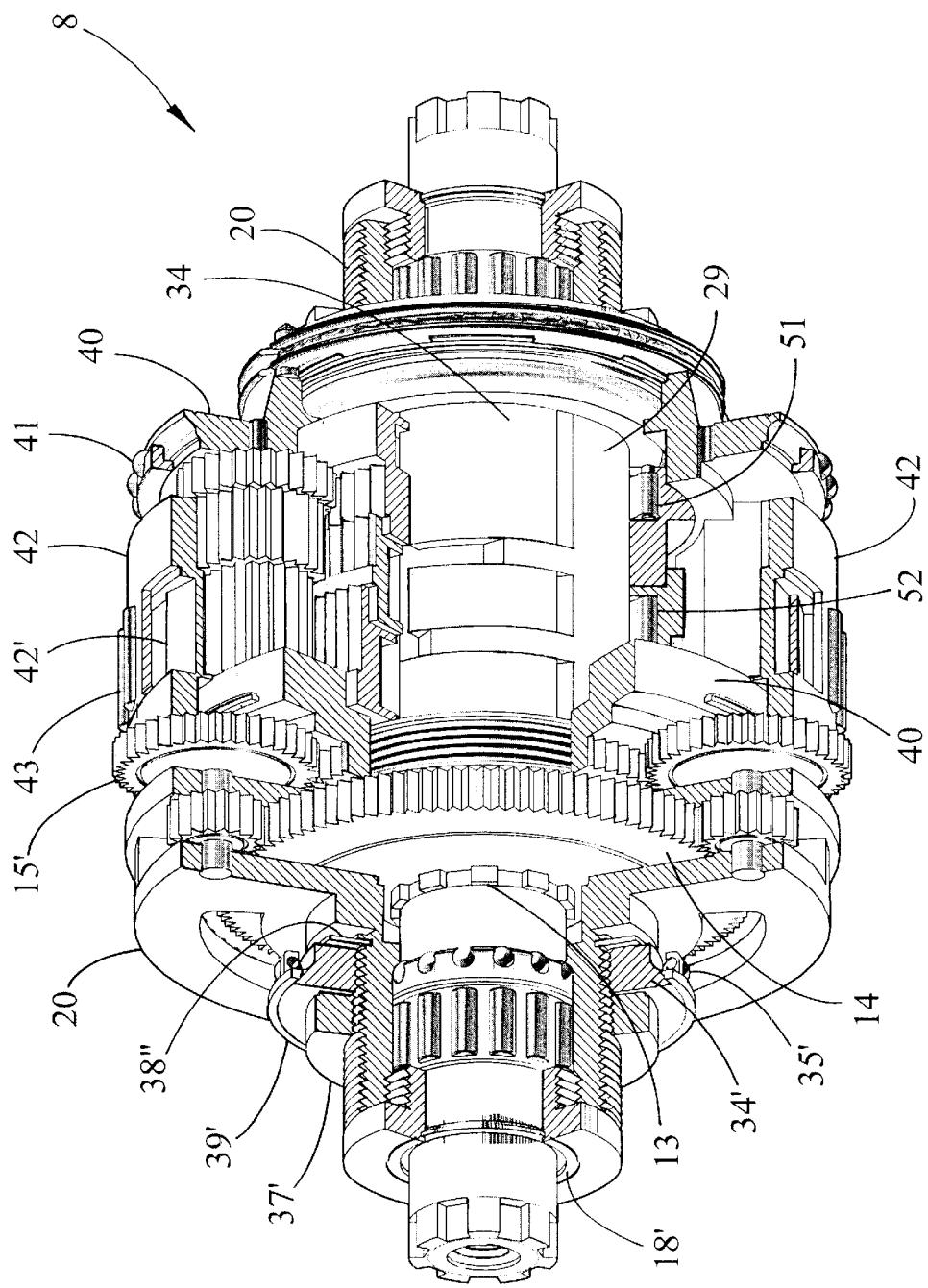
FIG. 11 is a left, front perspective view, in partial cross section, showing the drive train gear assembly fully assembled with the hub body removed.
Figure 12:
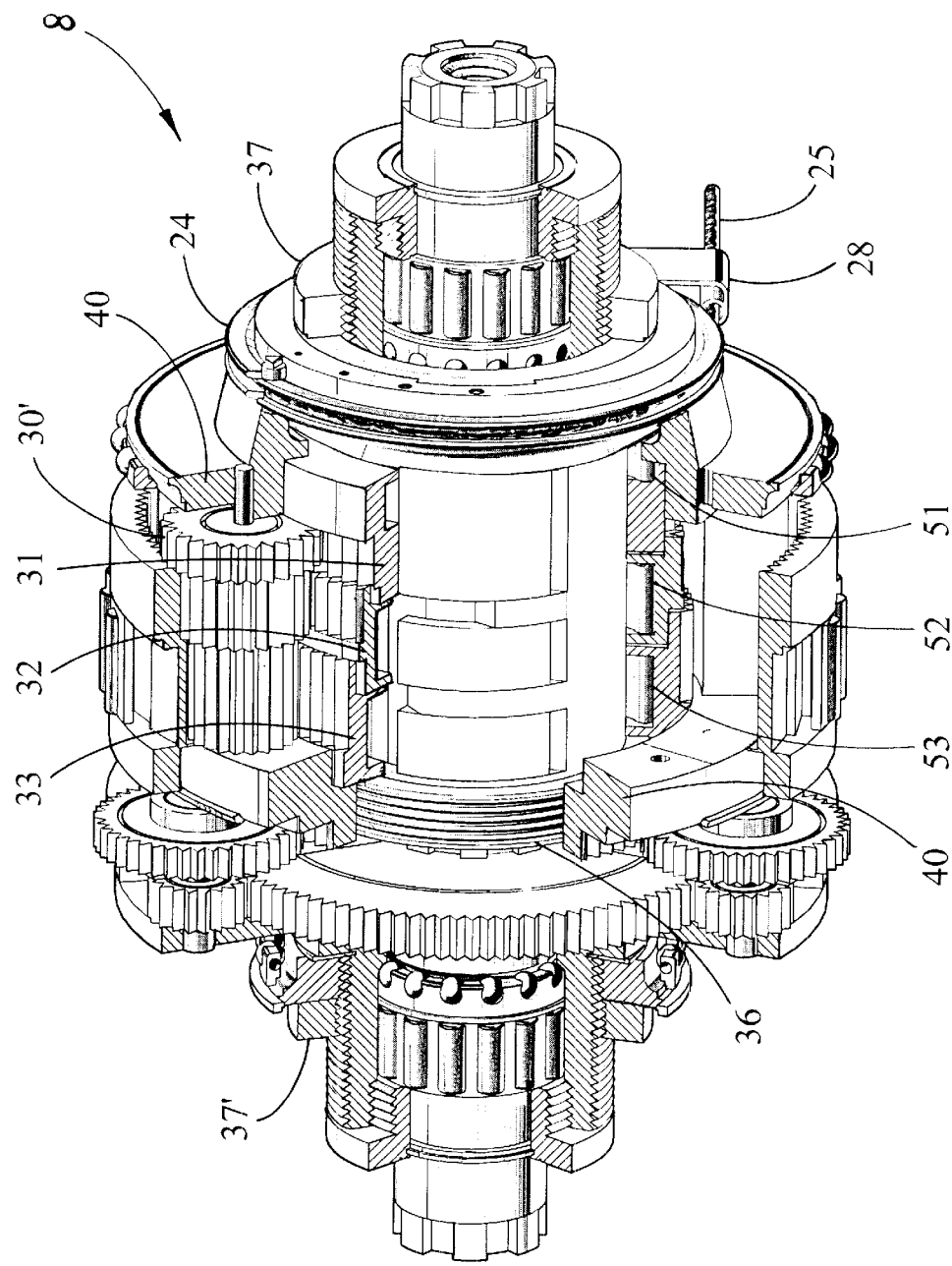
FIG. 12 is a right, front perspective view, in partial cross section, illustrating the drive train gear assembly fully assembled with the hub body removed.
Figure 13:
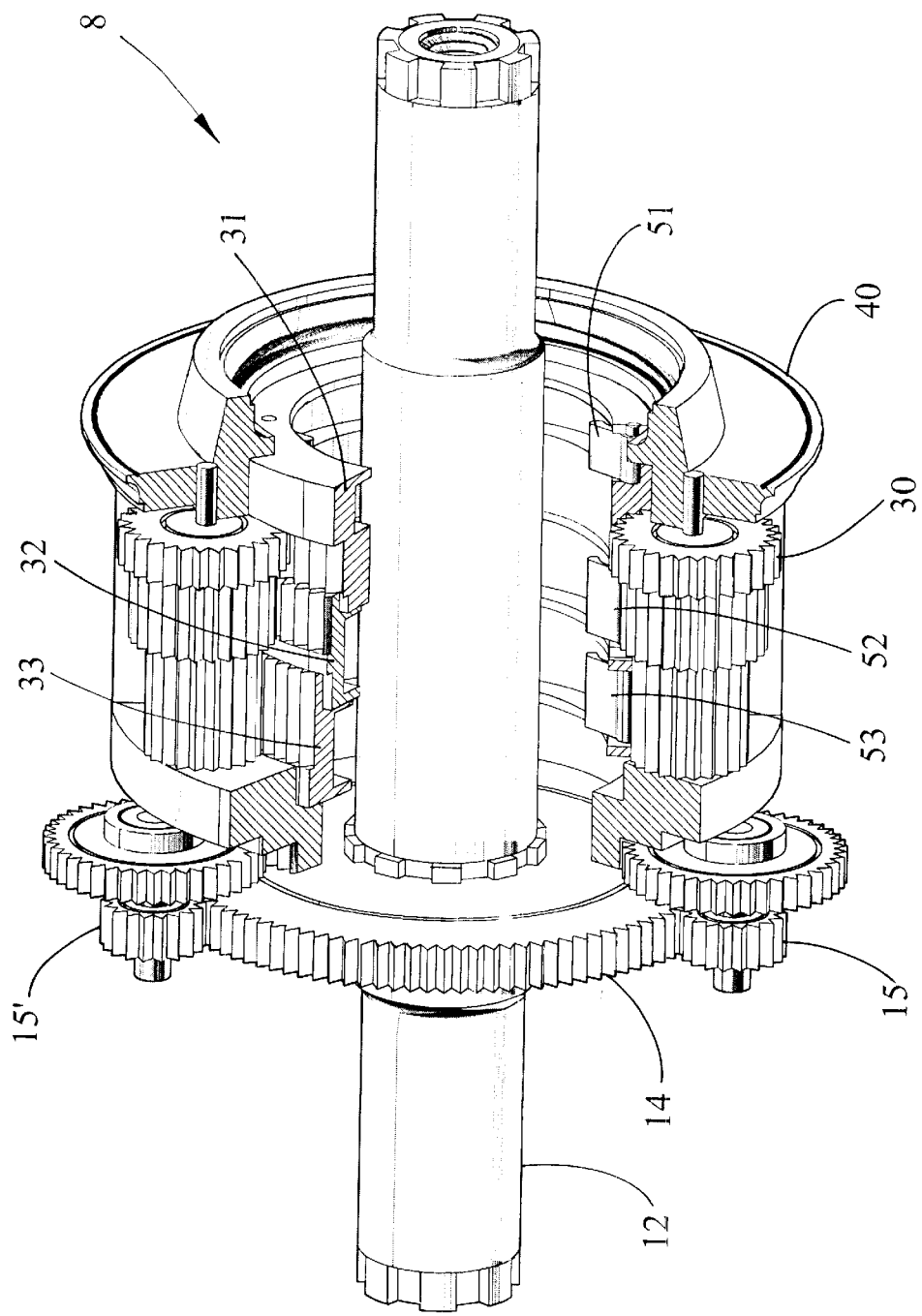
FIG. 13 is a right, front perspective view, in partial cross section, showing the hub axle bottom bracket shell, clutch assembly, and sun gear ring pawl and planetary gear assembly relative to the main drive gear and carrier gears.

Referring to FIG. 9, the drive train gear assembly further includes an annular gear ring 42 having an inner annular gear face 42" in driven, intermeshing engagement with the planetary gear groups 30, 30', 30", for relative rotation about the planetary gear groups and sun gear ring pawls 31, 32 and 33. An outer annular needle bearing 43 is fitted within the annular gear ring 42 and is structured to be driven by the annular gear ring 42 in one direction, while being further adapted to freewheel when the annular gear ring 42 rotates in an opposite direction.

In operation, rotation of the main drive gear 14 serves to counter-rotate the three carrier gears 15, 15' and 15". The carrier gears 15, 15' and 15" are in driving engagement with a toothed cage gear ring on the side of the planetary gear cage 40. Counter-rotation of the three carrier gears 15, 15' and 15" serves to drivingly rotate the planetary gear cage 40 in the same rotational direction as the primary drive gear 14. Rotation of the planetary gear cage 40 carries the planetary gear groups 30, 30' and 30" about the sun gear ring pawls 31, 32 and 33. Each planetary gear group 30, 30' and 30" includes three independent gears of different size, thereby providing three different gear ratios. Specifically, the first planetary gear group 30 includes planetary gears 30A, 30B and 30C. The second planetary gear group 30' includes planetary gears 30'A, 30'B and 30'C. Finally, the third planetary gear group 30" includes planetary gears 30"A, 30"B and 30"C. As mentioned above, each of these planetary gears (A, B and C) in the planetary gear groups provide three different gear ratios. The integral planetary gears are each disposed in driven engagement with three independent respective sun gear ring pawls 31, 32 and 33, as best seen in FIGS. 7 and 8. Specifically, planetary gears 30A, 30'A, and 30"A engage sun gear ring pawl 31. Planetary gears 30B, 30'B and 30"B engage sun gear ring pawl 32. Finally, planetary gears 30C, 30'C and 30"C engage sun gear ring pawl 33.

Driven rotation of the primary drive gear 14 when pedaling in the forward (i.e., clockwise motion) serves to engage the drive train assembly to ultimately rotate the hub body 10 including the hub shell 45, along with the rear wheel of the bicycle. The ratio of revolution of the hub shell 45 and rear bicycle wheel relative to the pedals and crank arms is dependent upon the ratio of revolution of the planetary gear groups 30, 30' and 30". More specifically, the gear sizes of each of the planetary gears of the planetary gear groups, as well as the gear size of the outer annular gear face of each of the sun gear ring pawls, work in conjunction to provide a variety of gear ratios to change speeds when pedaling the bicycle.

Figure 14:
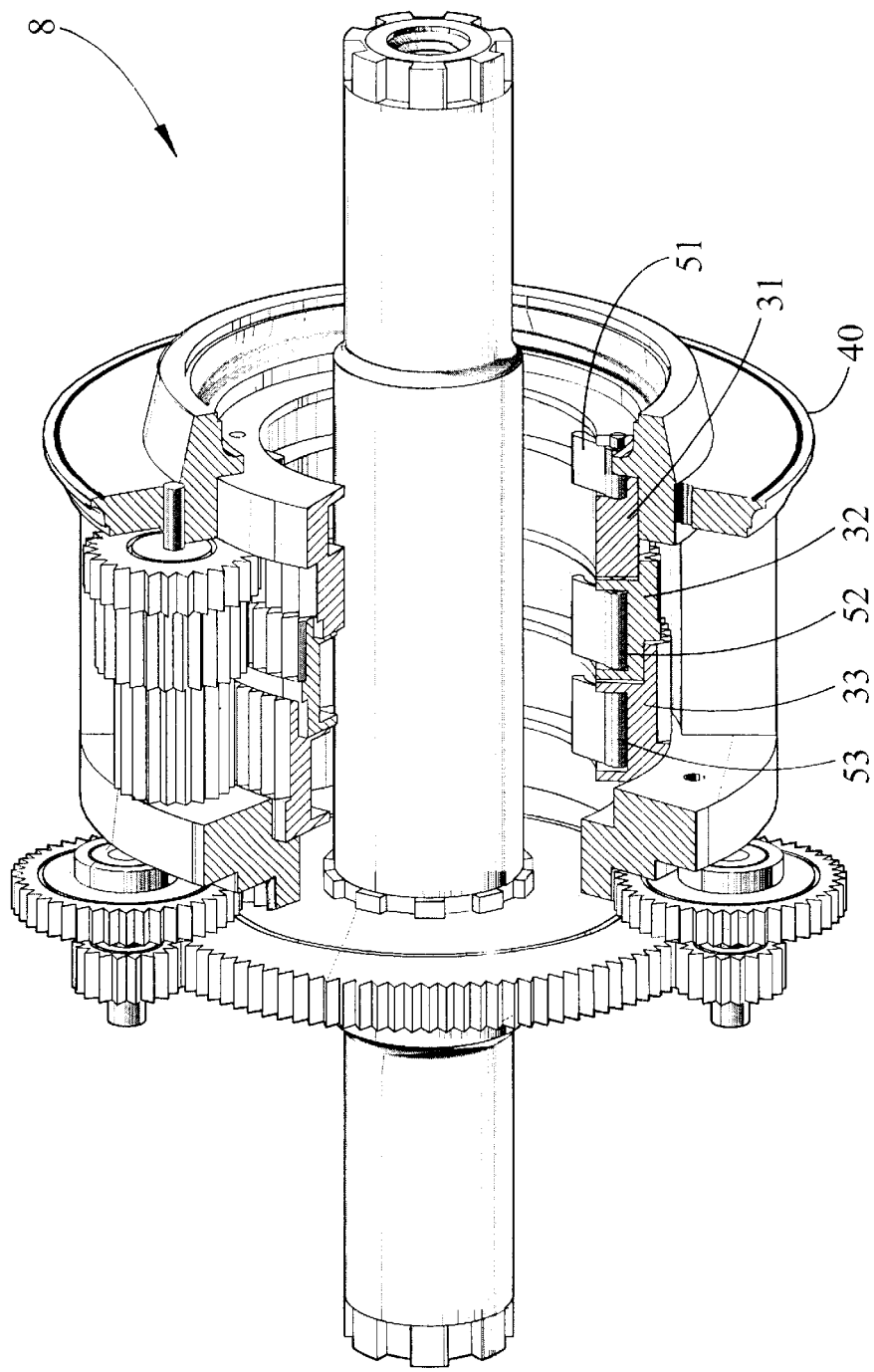
FIG. 14 is a right, front perspective view, in partial cross section, showing the identical assembly of FIG. 13 with one of the planetary gear groups removed to better illustrate pawls on the sun gear ring pawls.
Figure 15:
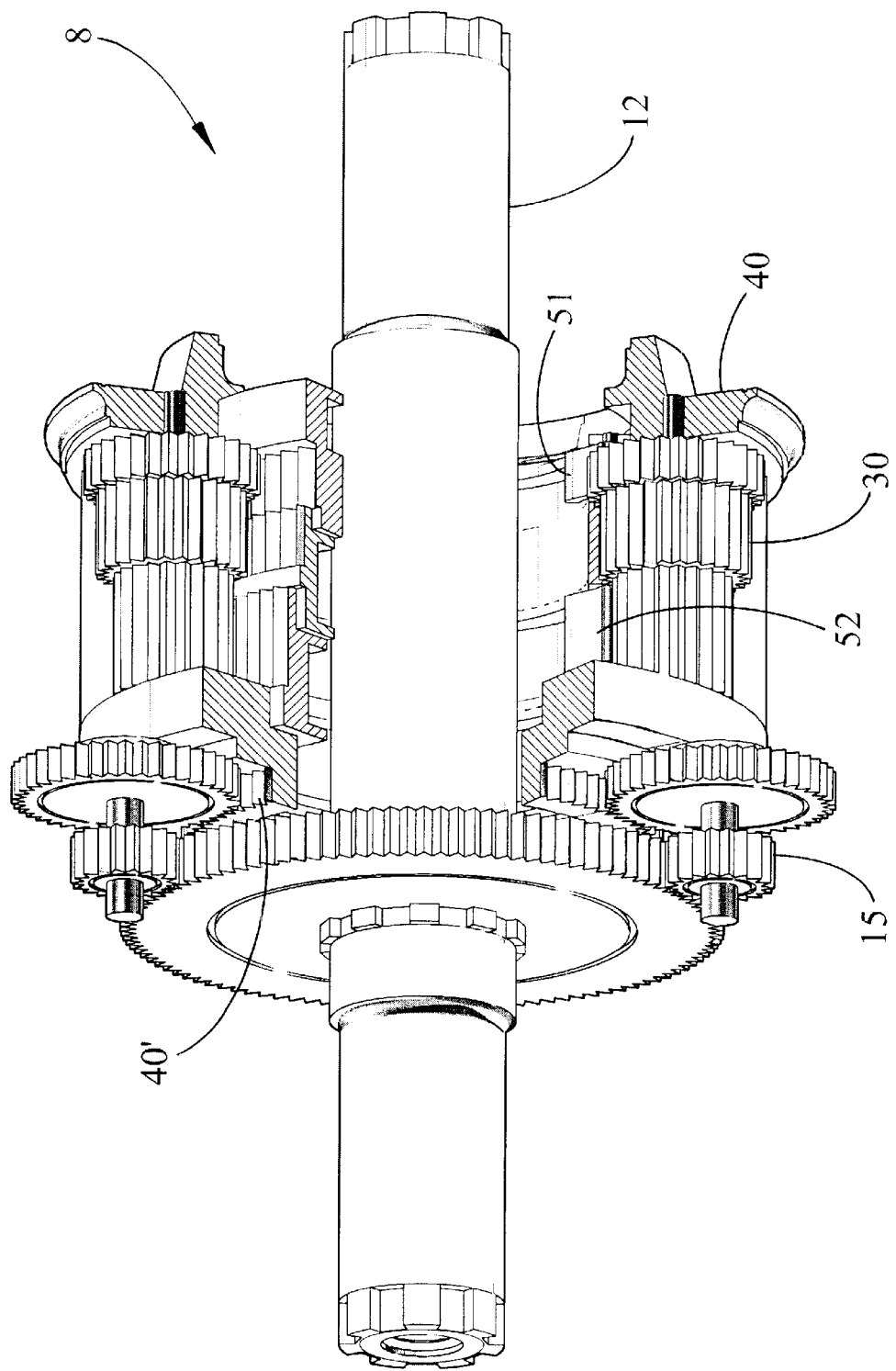
FIG. 15 is a left, front perspective view, in partial cross section, showing the assembly of FIG. 13.

The rider of the bicycle is provided with a control connected to a gear selector shifting cable 25 (see FIG. 6) to facilitate changing speeds. More specifically, operation of the gear control serves to manipulate the gear selector shifting cable 25 to change gears in the following manner. The gear selector shifting cable 25, when operated, rotates cassette joint pulley 24 approximately 20° from position 20A to a next position 20B, defining first gear (see FIG. 6). Upon movement of the cassette joint pulley 24 to the first gear position 28B, the clutch sleeve 29 is rotated approximately 20° (i.e., counter-clockwise) to cause pawl 51 of sun gear ring pawl 31 to engage the pawl stop 34. This engagement of the pawl 51 with the sun gear ring pawl 31 serves to stop the sun gear 31 from rotating, thus drivingly engaging the planetary gears 30A, 30'A, and 30"A with sun gear 31 (see FIGS. 6 and 14). Accordingly, the ratio of revolution between the pedals, crank arm and spindle relative to the hub 10 and bicycle wheel is directly related to the gear ratio between planetary gears 30A, 30'A, and 30"A and the engaged sun gear 31 when the drive train gear assembly is engaged in first gear, at position 28B.

Further operation of the gear selector shifting cable 25 rotates cassette joint pulley 24 another 20° from position 28B (i.e., first gear) to position 28C, defining second gear. Movement of cassette joint pulley 24 to the second gear position in turn rotates the clutch sleeve 29 approximately 20° (i.e., counter-clockwise) to cause pawl 52 of the sun gear ring 32 to engage pawl stop 34. This engagement causes sun gear ring 32 to be stopped, thereby engaging sun gear ring 32 with planetary gears 30B, 30'B, and 30"B. Again, the speed ratio between the crank arms and attached spindle and the hub and bicycle wheel are determined by the gear ratio between planetary gears 30B, 30'B and 30"B and the sun gear ring 32.

Further operation of the gear selector shifting cable 25 rotates cassette joint pulley 24 another 20° from second gear position 28C to position 28D, defining third gear. Operation of the cassette joint pulley 24 to the third gear position rotates clutch sleeve 29 yet another 20° (i.e., counter-clockwise) causing pawl 53 of the sun gear ring 33 to engage pawl stop 34. Engagement of pawl 53 with pawl stop 34 stops the sun gear ring 33 from rotating, thus engaging sun gear ring 33 with planetary gears 30C, 30'C, and 30"C. Again, the speed ratio is determined by the ratio of revolution of the planetary gears 30C, 30'C, 30"C around the sun gear ring 33.

The planetary gear groups 30, 30' and 30" and the planetary gear cage 40 rotate at different speeds depending upon which sun gear ring (i.e., 31, 32 or 33) is engaged with the planetary gear groups. In other words, if sun gear ring 31 is stopped (i.e., in the first gear position), the planetary gear groups 30, 30' and 30", as well as the planetary gear cage 40, are rotated by the driven engagement between planetary gears 30A, 30'A, and 30"A with sun gear ring 31. Likewise, when the sun gear ring 32 is stopped (i.e., in the second gear position), rotation of the planetary gear groups and planetary gear cage about the sun gear ring assembly is created by driven engagement between planetary gears 30B, 30'B and 30"B with sun gear ring 32. And, finally, driven engagement of sun gear ring 33 with planetary gears 30C, 30'C, and 30"C when in the third gear position serves to rotate the planetary gear groups and planetary gear cage at yet another speed.

The planetary gear groups 30, 30' and 30" are further engaged with annular gear 42 via an intermeshing engagement between planetary gears 30B, 30'B, and 30"B and the inner annular gear face 42" of annular gear 42, as best seen in FIG. 9. Accordingly, rotation of the planetary gear groups and the planetary gear cage serves to rotate the annular gear 42. The outer side of the annular gear ring 42 is provided with a teeth ring 42' which includes a plurality of teeth members having a sloped surface and an abrupt shoulder between the next adjacent tooth member. The teeth ring 42' extends about the entire annular gear ring 42" and receives an annular needle bearing therein. The annular needle bearing is provided with a plurality of rollers which are adapted to roll in one direction about the teeth ring 42' traveling over the sloped surfaces of each of the teeth. When the annular gear ring 42 and, accordingly, the teeth ring 42' is rotated in an opposite direction relative to the annular needle bearing 43, the rollers of the annular needle bearing 43 are caused to engage the abrupt shoulders formed between each of the teeth members of the teeth ring 42'. In a clockwise rotation of the annular gear ring 42, resulting from clockwise driven rotation of the crank arms 11 and attached spindle 12, the rollers of the outside annular needle bearing 43 engage the teeth ring 42' and further lockingly engage the hub shell 45 surrounding the drive train gear assembly. This results in driven rotation of the hub shell 45 along with the hub body and rear bicycle wheel. In a counter-clockwise rotation of the annular ring gear 42, caused by counter-clockwise rotation of the pedals, crank arms, and spindle (i.e., in a back pedaling or reverse rotation), the rollers of the outside annular needle bearing 43 disengage with the teeth ring 42' and act as a freewheel, thereby disengaging the drive train gear assembly from the hub shell 45, the hub body 10 and the rear wheel.

In a further embodiment of the present invention, a single speed hub and drive train gear assembly are provided along with the spindle 12 and crank arms 11, 11'. In this particular embodiment, the planetary gear groups, sun gear rings, and clutch assembly are eliminated. The single speed hub and drive train assembly of this embodiment includes the drive gear 14, the carrier gears 15, 15' and 15" which directly translate the rotational ratio of the drive gear 14 to the hub shell 45 via the annular gear 42. Again, reverse rotation of the pedals and spindle result in freewheeling, to disengage the drive train gear assembly from the hub shell 45.

While the instant invention has been shown and described in accordance with preferred and practical embodiments thereof, it is recognized that departures from the instant disclosure are contemplated within the spirit and scope of the present invention as defined in the following claims and as interpreted under the doctrine of equivalents.

What is claimed is:

1. A chainless drive train gear assembly for a rotating rear wheel supported on the frame of a bicycle, said assembly comprising:

an axle bracket fixed to the frame of the bicycle;

a spindle extending axially through the axle bracket and including opposite end zones;

left and right pedal crank arms attachable to the respective opposite end zones of said spindle for rotating the spindle upon application of a pedaling force;

a primary drive gear fixed to said spindle;

a plurality of carrier gears positioned and disposed in engagement with said primary drive gear, said plurality of carrier gears being structured and disposed to be drivingly rotated by said primary drive gear upon rotation of said spindle;

a planetary gear arrangement driven by said plurality of carrier gears, said planetary gear arrangement including:

a planet gear cage drivingly engaged with said plurality of carrier gears;

a plurality of sun gear rings of varying diameter supported in concentric arrangement about said spindle and each of said sun gear rings being independently rotatable;

a plurality of planetary gear groups supported by said planet gear cage and each including an integral set of planetary gears of varying diameter, each of said planetary gears being positioned and disposed in meshed engagement with corresponding ones of said plurality of sun gear rings;

a clutch assembly including means for selectively engaging and stopping rotation of individual ones of said plurality of sun gear rings to thereby drivingly engage the selected sun gear ring with said plurality of planetary gear groups in accordance with a selected speed ratio;

an annular gear ring rotatably supported about said planet gear cage and rotatably driven by said plurality of planetary gear groups;

a hub on the rear bicycle wheel and including a hub body rotatable with the rear bicycle wheel; and means on said annular gear ring for drivingly engaging said hub body in a forward direction, thereby rotating said rear bicycle wheel, and said means on said annular gear ring being structured and disposed to disengage said hub body when said annular gear ring is rotated in a reverse rotation, thereby resulting in free wheeling of the drive train gear assembly relative to the hub body.

2. The assembly as recited in claim 1 wherein said spindle is concentric with said hub and said rear wheel.

3. The assembly as recited in claim 2 wherein said plurality of carrier gears are positioned and disposed in meshed, driving engagement with a gear ring integrally formed on said planet gear cage.

4. The assembly as recited in claim 3 wherein said plurality of planetary gear groups are each rotatably supported on said planetary gear cage, and said planetary gear groups being structured and disposed to carry said planet gear cage about said plurality of sun gear rings upon meshed, driven engagement of any one of said planetary gears with a selected one of said corresponding ones of said plurality of sun gear rings.

5. A chainless drive train gear assembly for a rotating rear wheel supported on the frame of a bicycle, said assembly comprising:

an axle bracket fixed to the frame of the bicycle;

a spindle extending axially through the axle bracket and including opposite end zones, and said spindle being supported along an axis of rotation of said rear wheel;

left and right pedal crank arms attachable to the respective opposite end zones of said spindle for rotating the spindle upon application of a pedaling force;

a primary drive gear fixed to said spindle;

a plurality of carrier gears positioned and disposed in engagement with said primary drive gear, said plurality of carrier gears being structured and disposed to be drivingly rotated by said primary drive gear upon rotation of said spindle;

a planetary gear arrangement driven by said plurality of carrier gears and including a plurality of sun gear rings of varying diameter and a plurality of planetary gear groups, each of said planetary gear groups including an integral set of planetary gears of varying diameter in meshed engagement with corresponding ones of said plurality of sun gear rings;

clutch means for selectively engaging a select one of said plurality of sun gear rings with said planetary gear groups in accordance with a selected speed ratio;

a hub on the rear bicycle wheel and including a hub body rotatable with the rear bicycle wheel; and means for drivingly engaging said hub body in a forward direction upon driven engagement of said select one of said plurality of sun gear rings with said planetary gear groups, thereby rotating said rear bicycle wheel.

\* \* \* \* \*